United States Patent [19]

Sakaida et al.

[11] Patent Number: 4,795,524
[45] Date of Patent: Jan. 3, 1989

[54] APPARATUS FOR FIXING CAP ON END OF FILTER ELEMENT

[75] Inventors: Atsushi Sakaida, Nagoya; Masanori Suzuki; Yoshihiro Naito, both of Kariya, all of Japan

[73] Assignee: Nippondenso Co., Ltd., Kariya, Japan

[21] Appl. No.: 10,857

[22] Filed: Feb. 4, 1987

[30] Foreign Application Priority Data

Feb. 7, 1986 [JP] Japan .................................. 61-24178
Jul. 29, 1986 [JP] Japan ................................. 61-178088

[51] Int. Cl.$^4$ ............................................. B32B 31/04
[52] U.S. Cl. ..................................... 156/498; 156/499
[58] Field of Search ...................... 156/498, 499, 583.1, 156/DIG. 25, 69, 293, 294, 423

[56] References Cited

U.S. PATENT DOCUMENTS

| | | | |
|---|---|---|---|
| 3,367,261 | 2/1968 | Kashiwagi | 156/498 |
| 3,449,183 | 6/1969 | Zelnick | 156/498 |
| 3,880,695 | 4/1975 | Standley et al. | 156/498 |
| 3,938,931 | 2/1976 | Emmel | 156/498 |
| 3,964,958 | 6/1976 | Johnston | 156/498 |
| 4,380,484 | 4/1983 | Repik et al. | 156/498 |
| 4,443,288 | 4/1984 | Sawada et al. | 156/499 |
| 4,502,906 | 3/1985 | Young et al. | 156/498 |
| 4,556,445 | 12/1985 | McCormick | 156/499 |

Primary Examiner—Richard V. Fisher
Assistant Examiner—Wanda L. Millard
Attorney, Agent, or Firm—Cushman, Darby & Cushman

[57] ABSTRACT

An apparatus for fixing a cap (8) coated with a hot-melt adhesive on an end surface of a filter element (6), comprising a pair of vertical heating units (18, 19) installed in position (A) and an adjacent pair of vertical cooling units (20, 21) installed in position (B). The heating units (18, 19) comprises a pair of heaters (25, 29), each displaceable close to and away from the other so as to nip and release a pot assembly (9) accommodating the filter element (6) to be treated therebetween. The cooling units (20, 21) comprises a pair of coolers (30, 31) subjected to a similar movement. First, the pot assembly (9) occupies position (A) and is subjected to a heat treatment by the nip of the heaters (25, 29), causing melting of the hot-melt adhesive of the cap (8), and then transported to position (B) and subjected to a cooling treatment by the nip of the coolers (30, 31), causing solidification of the molten adhesive.

6 Claims, 5 Drawing Sheets

APPARATUS FOR FIXING CAP ON END OF FILTER ELEMENT

BACKGROUND OF THE INVENTION

1. Field of the Invention

The present invention relates to an apparatus for fixing a cap on each end surface of a filter element during assembly thereof, which filter element is used as an oil filter or an air filter for an automobile.

2. Description of the Related Art

In general, a disposable type filter element is produced by rolling a predetermined length of a strip of a filter material into a cylindrical form, after the strip has been corrugated, and mounting a cap at each end surface to hold the thus-obtained cylindrical form.

In the prior art, as shown in FIGS. 5a and 5b, an end cap 2 is prepared by applying an adhesive 3, such as polyvinyl chloride from a nozzle 1 onto a disc 2a made of steel and smearing the same uniformly over the inner surface of the disc 2a by a pallet 4. Thereafter, the end cap 2 is fitted on the respective end surface of a roll of filter material 5 to form a filter element 6 (see FIG. 5c). Then the filter element 6 is deposited in a hot air oven 7 (see FIG. 5d) to cure the adhesive 3 and fix the end cap 2a on the end surface of the filter element 6. This process, however, requires a considerable time, for example, 15 min., for curing the adhesive, which means that an oven having an extremely large capacity must be used to ensure an economical productivity of the process.

To eliminate the above drawback, an improved end cap 8 has been prepared, in place of the end cap 2 requiring a curing process, by utilizing a paper disc 8a having one surface coated with a hot-melt adhesive 8b. However, a process for effectively applying this latter end cap to a filter element has not been developed yet.

SUMMARY OF THE INVENTION

Accordingly, it is an object of the present invention to provide an apparatus for fixing the abovesaid end cap coated with a hot-melt adhesive to an end surface of a filter element, with a high and stable productivity.

The object of the present invention is achievable by an apparatus for fixing a cap coated with a hot-melt adhesive onto an end surface of a filter element, comprising a transporter displaceable between a first position and a second position remote from the first position at a predetermined distance in a horizontal direction; a pair of vertically arranged heating units, the axis of which passes by the first position; and a pair of vertically arranged cooling units, the axis of which passes by the second position. The transporter is provided with a vertical through-hole for holding in a fixed position a pot assembly for accommodating a filter element to be treated. The through-hole is designed to be in alignment with the axes of the pairs of heating and cooling units, respectively, when the transporter occupies the first and second positions. The heating units comprise a pair of heaters held in such a manner that each the heater is vertically reciprocatable while opposing free end surfaces thereof to each other, and, on the other hand, the cooling units comprise a pair of coolers held in such a manner that each cooler is vertically reciprocatable while opposing free end surfaces thereof oppose each other. According to these structure, the pot assembly deposited on the transporter occupying the first position is nipped between the upper and lower heaters in such a manner that the upper and lower surfaces of the pot assembly are brought into contact with the lower surface of the upper heater and the upper surface of the lower heater, respectively, by the upward movement of the lower heater through the through-hole, whereby the hot-melt adhesive on the end caps of the filter element accommodated in the pot assembly is melted by heat-transmission from the heaters through the pot assembly. At the next stage, after the transporter is displaced to the second position, the upper and lower surfaces of the pot assembly are brought into contact with the lower surface of the upper cooler and the upper surface of the lower cooler, respectively, by the upward movement of the lower cooler through the through-hole, whereby the hot-melt adhesive, in a molten state on the end caps of the filter element, is solidified by heat-transmission to the coolers through the pot assembly.

In the preferable embodiment, the up-down reciprocation of the lower heater and the lower cooler is carried out by a power cylinder incorporated in the respective unit. On the other hand, the same reciprocation of the upper heater and the upper cooler occurs in accordance with the former movement while loaded downward by a dead weight.

BRIEF DESCRIPTION OF THE DRAWINGS

The other objects and advantages of the present invention will be more apparent from the following description of the preferred embodiments with reference to the accompanying drawings: wherein.

DESCRIPTION OF THE PREFERRED EMBODIMENTS

Figure 1:
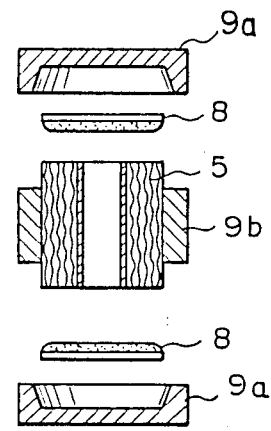
FIG. 1 is an exploded side sectional view of a pot assembly utilized for the present invention.
Figure 2:
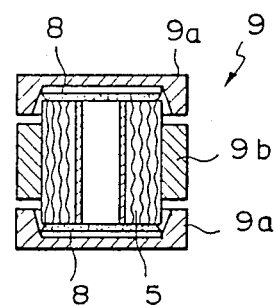
FIG. 2 is a side sectional view of a pot assembly shown in FIG. 1 in an assembled state.

A pot assembly 9 utilized for accommodating a filter element when the capping process is carried out by means of an apparatus according to the present invention is illustrated in FIGS. 1 and 2. A filter material 5 rolled into a cylindrical form is accommodated in a tubular body 9b and a pair of end caps 8 deposited on the upper and lower ends of the filter material 5. Then, a pair of lids 9a are fitted on each end of the filter material 5.

Figure 3:
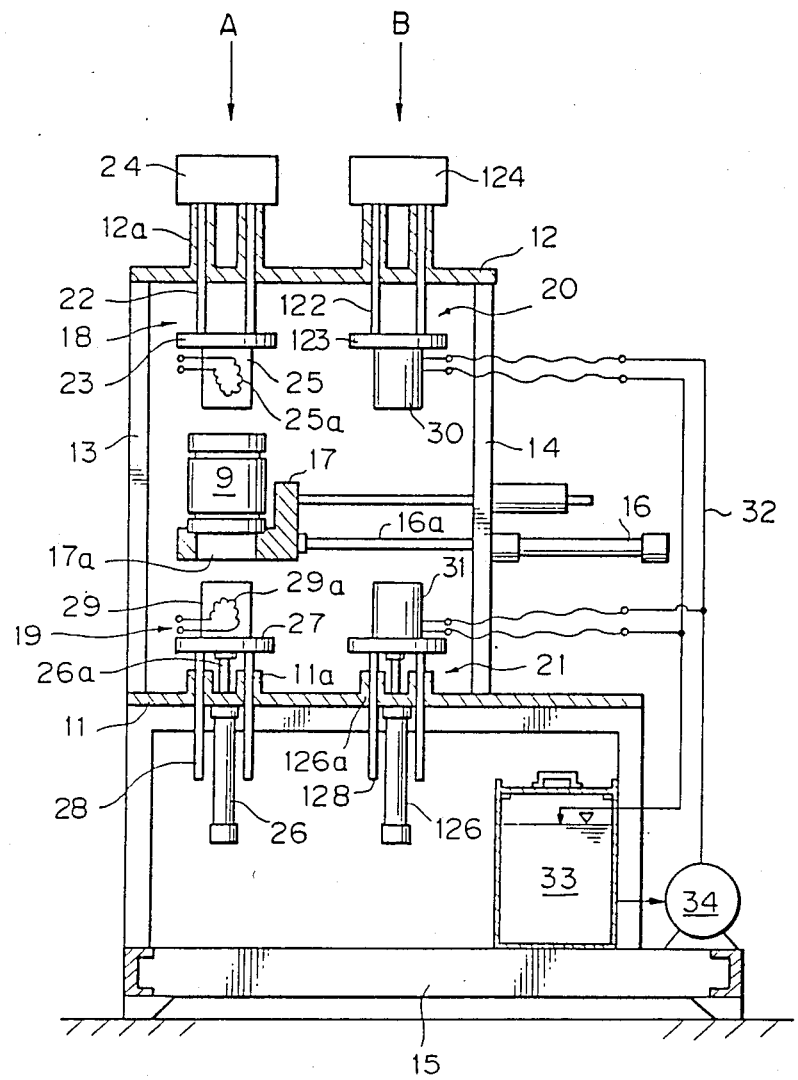
FIG. 3 is a diagrammatic side elevational view of a preferred embodiment of an apparatus according to the present invention.

With reference to FIG. 3, an apparatus for fixing an end cap on each end surface of the filter element is installed on a base 15 and supported by a frame constructed with a pair of horizontal members 11, 12 and a pair of vertical members 13, 14. On the right-hand vertical member 14 in FIG. 3 is mounted a power cylinder 16 so that a transporter 17 fixed to a free end of a piston rod 16a of the cylinder 16 is displaceable by a predetermined distance in a horizontal direction in accordance with the movement of the piston rod 16a. Accordingly, the transporter 17 can selectively occupy one of two positions A, B remote from each other at a predetermined horizontal distance, as stated later. Moreover, the transporter 17 has a vertical through-hole 17a therein having a stepwise recess around a periphery thereof for snugly holding the pot assembly 9 described above.

A pair of upper and lower heating units 18 and 19 are arranged in the upper and lower regions, respectively, along a vertical axis passing by the position A, while a pair of upper and lower cooling units 20 and 21 are arranged in a manner similar to the former along another vertical axis passing by the position B.

A detailed structure of the upper heating unit 18 will be described below. Two vertical pillars 22 are slidably inserted in the upper member 12 through the respective slide-bearings 12a. An upper plate 23 is commonly and fixedly mounted on the lower end of the pillars 22, while a dead weight 24 is commonly fixed to the upper end of the pillars 22. According to this structure, the upper plate 23 is prevented from an excessive downward movement by the engagement of the dead weight 24 with the upper member 12, but is allowed a limited lifting movement within a length corresponding to that of the pillar 22 projecting from the slide-bearing 12a, by a push-up force. A heater 25 is fixedly mounted to the lower surface of the upper plate 22, which heater is maintained at a predetermined temperature, such as 300° C., by a suitable heating means, such as an electric wire, and a thermo-controller (not shown). The heater 25 has a flat lower surface, made of a thermo-conductive material, so as to be in close contact with the upper surface of a pot assembly 9 deposited on the through-hole 17a of the transporter 17.

On the other hand, the lower heating unit 19 comprises a power cylinder 26 vertically mounted to the lower member 11 so that a piston rod 26a thereof is projected upward through the member 11. On a tip end of the piston rod 26a is fixedly mounted a lower plate 27 having two vertical pillars 28 extending downward which, in turn, are slidably inserted into the respective slide-bearings 11a bored through the lower member 11. According to this structure, the lower plate 27 can be subjected to a stable up-down reciprocation when the power cylinder 26 is actuated. On the upper surface of the lower plate 27, a heater 29 is mounted having the same structure as that of the abovesaid heater 25 of the upper heating unit 18. The upper part of the heater 29 has a shape and a size such that it can pass through the through-hole 17a. Further, the heater 29 has a flat upper surface, made of a thermo-conductive material, to be in close contact with the lower surface of a pot assembly 9.

The structure of the upper and lower cooling units 20 and 21 will be explained below. These cooling units have a structure similar to that of the above heating units except that upper and lower coolers 30, 31 are provided in place of the heaters 25, 29. That is, the upper cooling unit 20 has an upper plate 123 mounted to the lower ends of pillars 122, a cooler 30 fixedly mounted to the lower surface of the plate 123, and a dead weight 124 fixedly mounted to the upper ends of the pillars 122. On the other hand, the lower cooling unit 21 has a lower plate 127 fixedly supported on the upper ends of a piston rod 126a of a power cylinder 126. A cooler 31 is provided on the upper surface of the lower plate 127 and is subjected to a stable up-down reciprocation with the aid of pillars 128 and slide-bearings 11b. A cooling medium stored in a tank 33 disposed on the base 15 is circulated by a pump 34 through the coolers 30 and 31 via a piping 32 so that the coolers 30, 31 are maintained at a predetermined temperature, such as 30° C., by a thermo-controller (not shown).

Next, the operation of the apparatus according to the present invention will be explained below.

Figure 4:
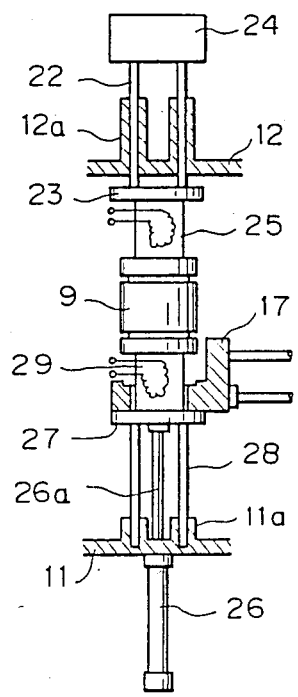
FIG. 4 is a partial view of FIG. 3, illustrating the engagement of a heating unit with the pot assembly.
Figure 5A:
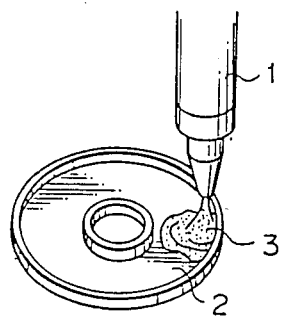
FIGS. 5a through 5d illustrate one example of steps of an prior art capping system, respectively.
Figure 5B:
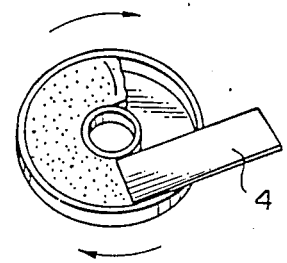
Figure 5C:
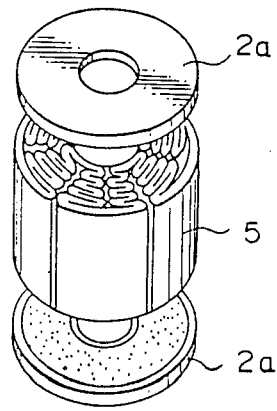
Figure 5D:
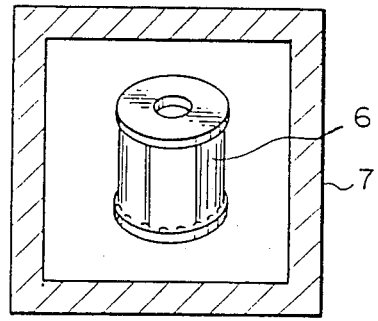
Figure 6:
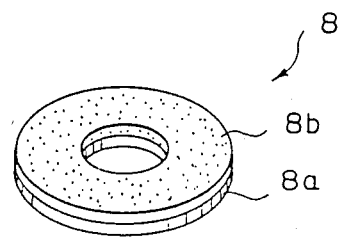
FIG. 6 is a perspective view of an end cap utilized for the present invention.

The pot assembly 9 is deposited in the through-hole 17a of the transporter 17 by a suitable loader (not shown), while the heaters 25, 29 and the coolers 30, 31 are maintained at the respective predetermined temperatures. The power cylinder 16 is then actuated to displace the transporter 17 to the position A, in which the pot assembly 9 is in alignment with the axis of the heating units 25, 29, as shown in FIG. 3. Next, the power cylinder 26 is actuated to raise the lower plate 27 into the through-hole 17a, to bring the upper surface of the heater 29 into close contact with the lower surface of the pot assembly 9. The lower plate 27 continues to rise and, therefore, the heater 29 pushes up the pot assembly 9 while keeping the contact therebetween. During this upward movement, the upper surface of the pot assembly 9 is pressed onto the lower surface of the heater 29 of the upper heating unit 18. As the lower plate 27 further continues to rise, which causes the dead weight 24 to be pushed up by the pillars 22, as shown in FIG. 4, a pressure is applied to the contacting surfaces between the heater 25, 29 and the pot assembly 9, which pressure is caused by a gravitational force of the upper heating unit 18 including the dead weight 24, and thus the heat-transfer from the heaters to the pot assembly is further developed.

According to this improved heat transfer, the temperature of the lid 9a is effectively elevated, and after a certain period, reaches the melting point of the hot-melt adhesive of the cap 8, such as 230° C., at which the hot-melt adhesive is liquidized and impregnated uniformly into the end surface of the filter material 5. After the lapse of a predetermined time period calculated by adding the time necessary for temperature elevation and the time necessary for adhesive impregnation, such as 30 seconds, the power cylinder 26 is actuated in reverse to lower the lower heating unit 19, whereby the total heating units resume the original position. The pot assembly 9 also returns to the transporter 17 while free from the contact between both heaters 25, 29.

Next, the power cylinder 16 is actuated to displace the transporter 17 to the position B at which the pot assembly 9 is in alignment with the axis of the cooling units 20, 21. The lower cooler 31 is pushed up by the power cylinder 126 in the same manner as for the heating process described above. The cooler 31 continues to rise while in contact with the lower surface of the pot assembly 9, and causes the upper surface of the pot assembly 9 to touch the lower surface of the upper cooler 30. The gravitational pressure applied on the surface in contact between the pot assembly 9 and coolers 30, 31 by the dead weight 124 enhances the effective heat transfer from the lids 9a of the pot assembly 9 to the coolers 30, 31, whereby the molten hot-melt adhesive is quickly and uniformly solidified, and thus the fixation of the cap 8 to the filter element 6 is achieved. After the lapse of the necessary time period, such as 30 seconds, required for the completion of the solidification of the adhesive, that is, one necessary for lowering the temperature of the hot-melt adhesive to below 180° C., the power cylinder 126 is actuated in reverse to cause the cooling system to resume the original position. Further, the power cylinder 16 is actuated to displace the transporter 17 to the position A, at which the pot assembly 9 thus treated is removed from the transporter 17 by a suitable unloader (not shown), and a non-treated fresh pot assembly is then fitted on the transporter 17 to repeat the above steps. The pot assembly removed from the apparatus is separated and the completed filter element 6 is exposed.

According to this inventive apparatus, the time period necessary for treating one filter element is within a range of from 1 to 2 min., which in the conventional system, requires about 20 min.

In the above description, the heating and cooling time is adopted as a measure of the sequence control for the succeeding steps, predetermined by a timer. Another measure, such as a surface temperature of the pot assembly directly detected, however, may be utilized for this purpose. The difference of height of the pot assembly before and after the adhesive has been melted may be adopted as a measure for sequence control, because the height of the pot assembly decreases when the adhesive has been melted and impregnated into the filter material.

Further, a spring or a power cylinder may be utilized as a means for biasing the upper heating and cooling units downward, instead of the dead weight.

A plurality of sets of the heating and cooling units may be arranged in one apparatus to improve the productivity of the apparatus.

Figure 7A:
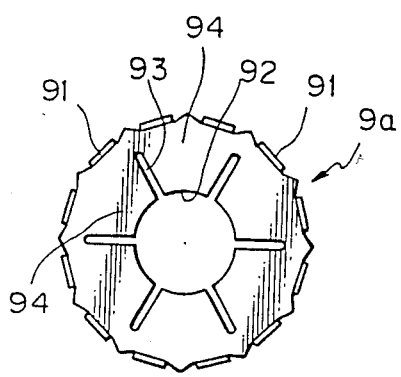
FIGS. 7(a) and 7(b) illustrate a preferred embodiment of a lid of a pot assembly; and, FIGS. 8 and 9 are similar views as FIGS. 1 and 2, respectively, illustrating a pot assembly utilizing a lid shown in FIG. 7.
Figure 7B:
Figure 8:
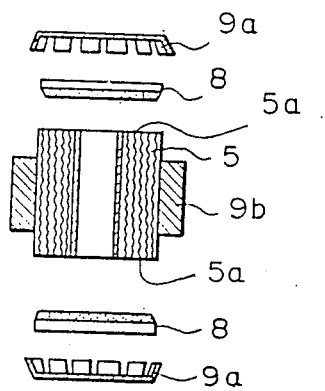
Figure 9:
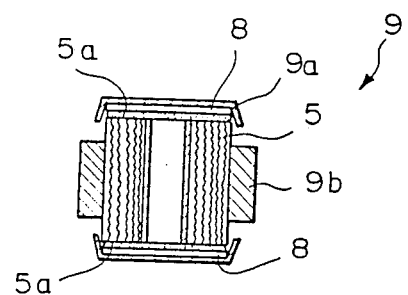

A more preferable lid 9a of the pot assembly 9 is illustrated in FIGS. 7 through 9. With reference to FIG. 7, the improved lid 9a has a polygonal shape close to a circle and is provided with a plurality of tongues 91 on the outer periphery thereof, bending generally in the vertical direction. A circular opening 92 is provided in the center of the lid 9a, which corresponds to the center aperture of the rolled filter material 5 to be accommodated in the pot assembly 9. The opening 92 has a plurality (six in this case) of radial slits 93 extending outward from the periphery thereof.

The lid 9a is preferably made of metal having a high elastic modulus, such as phosphor bronze, beryllium copper, nickel silver, or spring steel, and has a thickness in a range of from 0.1 mm to 0.8 mm. A lid made of phosphor bronze having a thickness of 0.6 mm is most advantageous.

According to the above structure, the lid 9a is substantially sectioned into a plurality (six in this case) of leaves 94 by the opening 92 and the slits 93, which enhances the good deformability of the lid 9a with the aid of a thinner thickness of the highly elastic material. Therefore, even if the end surface of the filter material 5 has a non-plain profile with undulations thereon, the lid 9a can be deformed in accordance with these undulations, whereby the profile of the end surface can be corrected to be flat during the aforesaid heat-pressing process by the heater 25 and 29. In addition, the heat from the heater 25, 29 is rapidly transferred to the end surface of the filter material 5 through the thin lid 9a, whereby the hot-melt adhesive coated to the cap 8 can be readily and uniformly melted and the cap 8 fixed to the end surface of the filter material 5 without a residual gap therebetween. In this regard, FIGS. 8 and 9 illustrate the sectional side views of the pot assembly in the exploded assembled state, respectively.

As stated above, according to the present invention, fixing of the end cap onto the end surface of the filter material can be completed within a shorter period, because the filter material restrained within the pot assembly is subjected to the heating and cooling process in a highly pressurized state.

Compared with the conventional system utilizing a large size hot air oven, the apparatus of the present invention can be much smaller in size. This results in a great reduction of the installation space, energy consumption, and processing period necessary for heating and cooling the system.

Moreover, since the filter elements are processed sequentially one by one, an automatic production line for connecting this apparatus to a subsequent process can be easily laid out.

We claim:

1. An apparatus for fixing a cap coated with a hot-melt adhesive onto an end surface of a filter element, comprising a transporter (17) displaceable between a first position (A) and a second position (B) remote from the first position (A) at a predetermined distance in a horizontal direction;

a pair of vertically arranged heating units (18, 19), the axis of which passes by the first position (A); and a pair of vertically arranged cooling units (20, 21), axis of which passes by the second position (B);

the transporter (17) being provided with a vertical through-hole (17a) for holding in a fixed position a pot assembly (9) for accommodating a filter element (6) to be treated; the through-hole (17a) being designed to be in a alignment with the axes of the pairs of heating and cooling units (18, 19; 20, 21), respectively, when the transporter (17) occupies the first and second positions (A, B); the pot assembly (9) comprising a cylindrical tubular member (9b) for closely accommodating a midportion of a filter element (6) therein and a pair of disc-like lids (9a) made of a heat-conductive material for covering the respective end surfaces of the filter element (6) including an end cap (8) having an hot-melt adhesive applied inside thereof, the lids (9a) being in contact with the heaters (25, 29) and the coolers (30, 31) during the heating and cooling operation of the apparatus;

the heating units (18, 19) comprising a pair of heaters (25, 29) held in such a manner that each heater (25, 29) is vertically reciprocatable while having free end surfaces thereof opposing each other; and the cooling units (20, 21) comprising a pair of coolers (30, 31) held in such a manner that each cooler (30, 31) is vertically reciprocatable while having free end surface thereof opposing each other; wherein the pot assembly (9) deposited on the transporter (17) occupying the first position (A) is nipped between the upper and lower heaters (25, 29) in such a manner that the upper and lower surfaces of the pot assembly (9) are brought into contact with the lower surface of the upper heater (25) and the upper surface of the lower heater (29), respectively, by the upward movement of the lower heater (29) through the through-hole (17a), whereby the hot-melt adhesive on the end caps of the filter element (6) accommodated in the pot assembly (9) is melted by heat-transmission from the heaters (25, 29) through the lid (9a) of the pot assembly (9), and after the transporter (17) is displaced to the second position (B), the upper and lower surfaces of the pot assembly (9) are brought into contact with the lower surface of the upper cooler (30) and the upper surface of the lower cooler (31), respectively, by the upward movement of the lower cooler (31) through the through-hole (17a), whereby the hot-melt adhesive in a molten state on the end caps of the filter element (9) is solidified by heat-transmission to the coolers (30, 31) through the lid (9a) of the pot assembly (9).

2. A pot assembly as defined by claim 1, wherein the lid (9a) is made of a thin metal sheet having a high elastic modulus.

3. A pot assembly as defined by claim 2, wherein the material composing the lid (9a) is selected from a group of phosphor bronze, beryllium copper, nickel silver, and a spring steel.

4. An apparatus as defined by claim 1, wherein the up-down reciprocation of the lower heater (29) and the lower cooler (31) is carried out by means of a power cylinder (26, 126) incorporated in the respective unit (19, 21), and on the other hand, the same reciprocation of the upper heater (25) and the upper cooler (30) occurs in accordance with the former movement while loaded downward by a dead weight (24, 124).

5. An apparatus as defined in claim 1, wherein the heaters (25, 29) are heated by an electric wire built-in in the respective heaters, and the coolers (30, 31) are cooled by a cooling medium stored in a tank (33) and circulated through the respective coolers by means of a pump (34) through a piping (32).

6. A pot assembly as defined by claim 1, wherein a thickness of the lid (9a) is within a range of from 0.1 mm to 0.6 mm.

* * * * *